US008108123B2

(12) United States Patent
Sarlashkar et al.

(10) Patent No.: US 8,108,123 B2
(45) Date of Patent: Jan. 31, 2012

(54) SLIDING MODE CONTROL SYSTEM FOR INTERNAL COMBUSTION ENGINE

(75) Inventors: Jayant V. Sarlashkar, San Antonio, TX (US); Theodore M. Kostek, San Antonio, TX (US); Ryan Roecker, San Antonio, TX (US); Gary D. Neely, Boerne, TX (US); Shizuo Sasaki, San Antonio (JP)

(73) Assignee: Southwest Research Institute, San Antonio, TX (US)

( * ) Notice: Subject to any disclaimer, the term of this patent is extended or adjusted under 35 U.S.C. 154(b) by 388 days.

(21) Appl. No.: 12/464,632

(22) Filed: May 12, 2009

(65) Prior Publication Data

US 2010/0292907 A1 Nov. 18, 2010

(51) Int. Cl.
*B60T 7/12* (2006.01)

(52) U.S. Cl. ......................... 701/103; 123/434; 123/674

(58) Field of Classification Search .......... 701/103–105, 701/114, 115; 123/434, 436, 672, 674, 676–679, 123/455, 462, 478, 480

See application file for complete search history.

(56) References Cited

U.S. PATENT DOCUMENTS

| | | | | |
|---|---|---|---|---|
| 5,048,495 | A * | 9/1991 | Onari et al. | 123/492 |
| 6,263,856 | B1 * | 7/2001 | Weber et al. | 123/352 |
| 6,295,967 | B1 * | 10/2001 | Weber et al. | 123/399 |
| 6,367,449 | B1 | 4/2002 | Moteki et al. | 123/399 |
| 6,718,922 | B2 | 4/2004 | Yasui | 123/90.17 |
| 7,073,494 | B2 * | 7/2006 | Cullen et al. | 123/698 |
| 2010/0042284 | A1 * | 2/2010 | Sasaki | 701/29 |

OTHER PUBLICATIONS

Malkhede, et al.; "Robust Sliding Mode Controller for Turbocharged Diesel Engine With Parameter Perturbations"; 2007 Mediterranean Conference on Control and Automation, Athen Greece:, pp. 6, Jul. 27-29, 2007.

* cited by examiner

*Primary Examiner* — John Kwon
(74) *Attorney, Agent, or Firm* — Ann C. Livingston

(57) ABSTRACT

A system and method for using a sliding mode control algorithm to control flow rates from air handling actuators and fuel injectors of an internal combustion engine. The sliding mode control is based on an engine model that represents the engine in terms of pressure and oxygen content states of the intake and exhaust manifolds (as a linear term) and controllable flow rates (as a nonlinear term).

16 Claims, 2 Drawing Sheets

SLIDING MODE CONTROL SYSTEM FOR INTERNAL COMBUSTION ENGINE

TECHNICAL FIELD OF THE INVENTION

This invention relates to control systems for internal combustion engines, and more particularly to a control system for controlling an engine's fuel quantity and the gas flow output of its air handling devices.

BACKGROUND OF THE INVENTION

Today's internal combustion engines are electronically controlled by processor-based engine control units (ECUs). An ECU can control many aspects of the engine's operation, such as fuel quantity, ignition timing, variable valve timing (VVT), turbocharger output, and other engine operating parameters.

An ECU determines these parameters primarily by monitoring the engine through various sensors. These sensors can include a MAP (manifold air pressure) sensor, throttle position sensor, air temperature sensor, oxygen sensor, coolant temperature sensor, mass air flow sensor, crankshaft angle sensor, camshaft angle sensor, knock sensor, and many others. The ECU monitors the output signals produced by these sensors, and adjusts the system inputs as necessary.

Considerable effort is devoted to designing ECU programming that will provide optimal engine operation. Modern engines have nonlinear dynamics, and various nonlinear control methods have been developed.

One such nonlinear control method is "sliding mode control", which is a control method having high robustness with restraining influence from disturbance. As examples, applications of sliding mode control have been developed for engine throttle control and cam phase control. These control methods are described in U.S. Pat. Nos. 6,367,449 and in 6,718,922, respectively.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
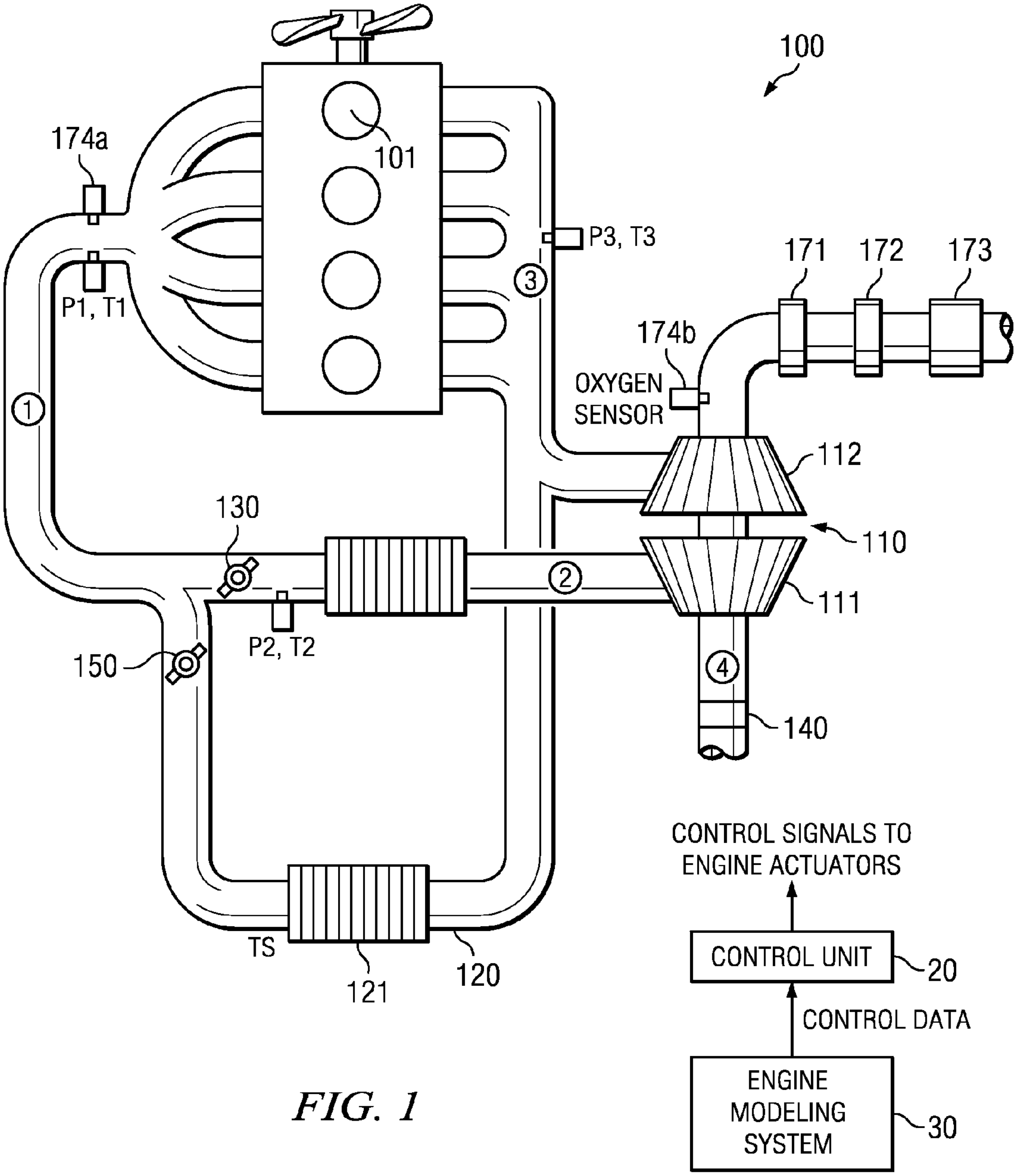
FIG. 1 is a simplified illustration of an internal combustion engine having a control unit that implements sliding mode control in accordance with the invention.

FIG. 1 is a simplistic illustration of an internal combustion engine 100. An example of such an engine 100 is a light duty 4-cylinder common rail diesel engine.

Engine 100 is equipped with a turbocharger 110, and a high pressure EGR (exhaust gas recirculation) loop 120. The tailpipe has various exhaust treatment devices, such as a diesel oxidation catalyst 171, diesel particulate filter 172, and lean NOx trap 173. Although not shown, engine 100 is equipped with fuel injectors for injecting a supply fuel quantity, q, into its cylinders 101.

Modeling system 30 models engine 100 for purposes of designing a control system 20 for optimal engine operation. Modeling system 30 can be implemented with computer equipment programmed to store and execute the equations and data described herein.

As explained above, control system 20 is designed using modeling system 30, and for production engines is implemented with appropriate engine control system hardware and software. Specifically, for purposes of this invention, during engine operation, control unit 20 determines fuel injection quantity and various gas flow amounts, and delivers corresponding control signals to the fuel injectors and various air handling devices. Thus, modeling system 30 is used for preproduction development, whereas control system 20 is an "on-line" real-time control system.

Various sections associated with the air intake and exhaust of engine 100 are each represented in the engine model. These include:

- Section 1 intake manifold (between the high-pressure throttle and high-pressure EGR valve and engine intake valves)
- Section 2 intake passage between compressor and high pressure throttle
- Section 3 exhaust manifold
- Section 4 intake to turbocharger The engine model described herein may be generally described as an "engine intake and exhaust system dynamic model". The air handling actuators of interest for the model are the turbocharger 110 (its output flow), the intake manifold throttle 130, and EGR throttle 150.

These actuators are used to control the fresh air and pressure so that these parameters are appropriate for a desired combustion. If a desired pressure or fresh air flow amount is known, control system 20 can be used to determine how to actuate throttles 130 and 150 and the output of turbocharger 110.

Turbocharger 110 has a compressor 111 and turbine 112, and is assumed to be a variable output turbocharger. An example of a suitable turbocharger is a variable nozzle turbocharger (VNT).

Engine 100 also has an EGR (exhaust gas recirculation loop), which is a high pressure loop. EGR cooler 121 cools the exhaust before it is mixed with fresh air from the compressor 111.

Temperatures at various intake and exhaust points of engine 100 are also represented in the model. FIG. 1 illustrates the location of various temperature and pressure measurement sensors, for sensing T1, T2, and T3 (temperatures) and P1, P2, and P3 (pressures). Some temperature and pressure values can be inferred or assumed. For example, P4 is assumed to be the atmospheric pressure. Oxygen (O2) sensors 174*a* and 174*b* are installed to measure the O2 in the intake and exhaust manifolds.

Detection signals from the various sensors are input to control unit 20, which is equipped with a microcomputer. The control unit 20 detects the engine rotation speed Ne from data provided by the crank angle sensor. Control unit 20 uses a sliding mode control method, as described herein, to provide control signals to various actuators, such as for fuel quantity injection control, control of various throttles, and the turbocharger.

Engine 100 may be modeled mathematically by the following nonlinear dynamical equation:

$$\dot{x}=f(x)+G(x)u, \tag{1}$$

where x represents the states of the manifolds (intake and exhaust), and u represents controllable flow rates (such as fresh air, recirculated exhaust gas, and fuel quantity). This dynamic model may be referred to as an "emptying and filling" model. A feature of the above model is that it does not include turbocharger dynamics.

Typical values of the state variable x (the manifold states conditions) are values of pressure (p) and oxygen (f) concentration/fraction. These values are an n-dimensional state vector, represented as:

$$x=(p_1, f_1, p_3, f_3)^T,$$

where $p_1$ and $f_1$ are pressure and oxygen concentration in the intake manifold, and $p_3$ and $f_3$ are pressure and oxygen concentration in the exhaust manifold, as illustrated in FIG. 1.

For designing control unit 20, target manifold state values are predetermined, based on engine speed (Ne) and accelerator pedal position. As explained below, during engine operation, these target states are differenced with measured states to obtain an "error" value. Thus, it is assumed that all manifold state values may be measured or are otherwise available, such as by estimation.

The values of u are "flow values", and are an m-dimensional input vector that is used for state feedback. Values of u are expressed herein with a "w" (gas flow rates) and an identifying subscript, or with "q" (fueling quantity). Thus, for example:

$$u=(w_{HPT}, w_{HPE}, w_{VNT}, q)^T,$$

where the subscripts HPT, HPE, and VNT denote the high pressure throttle 130, high pressure EGR valve 150, and variable nozzle turbocharger 110, respectively.

The states and inputs of Equation (1) can be modified for engine variations, such as additional EGR loops. In general, the control method and system described herein may be used for these flow values, or for any subset of these flow values, or may be modified to include additional flow values.

A feature of the modeling method of this description is that the inputs enter Equation (1) in an affine linear manner (for a fixed x). This structure of the dynamics model makes Equation (1) suitable for a sliding mode control law.

In the context of this description, sliding mode control is characterized by choosing one sliding surface per state. The control method is designed to drive each system state onto the sliding surface from an initial state, and to maintain it along that surface for subsequent times. The dynamic behavior of the system is defined by the equation of the sliding surface and is a design choice. In other words, in "sliding mode", the system slides along a surface, and any tendency of the system to depart from the surface is countered by a control effort. Such tendency is caused, for example, by parametric variations in the system. The control effort that drives the system to the sliding surface provides robustness against parametric variations.

For purposes of this description, s=0 represents a number of sliding surfaces (also referred to as switching surfaces), where the number of sliding surfaces is the number of states. Consistent with sliding mode control, the object of the control system is to arrive at and to maintain s=0. Doing so guarantees that given state targets are tracked, where the states are the pressure and the O2 amount in the intake and exhaust manifolds as described above.

Consistent with sliding mode control, the following expressions are true. The state error, e, is:

$$e=x-x^*,$$

where x* is a desired state, typically a function of pedal position and engine speed as stated above, and x is an actual (measured) state. Also, the integral error, σ, is:

$$\dot{\sigma}=e$$

The sliding surfaces, s, where s defines as many surfaces as the number of states, is:

$$s=M\sigma+e$$

The quadratic Lyapunov function is used to derive a control law (expression for inputs u in terms of state x), where s=−A sgn(s):

$$\dot{s}=M\dot{\sigma}+\dot{e}$$

$$\dot{s}=Me+\dot{x}-\dot{x}^*$$

$$-A\,\mathrm{sgn}(s)=Me+f(x)+G(x)u-\dot{x}^*$$

$$u=G^{-1}(x)[\dot{x}^*-f(x)-Me-A\,\mathrm{sgn}(s)],$$

where the equation for u is in sliding mode control form. The matrices M and A are constant gain matrices. A suitable matrix form is a diagonal matrix with real positive entries. Matrix M could be a general symmetric positive definite real matrix. Matrix M defines the dynamics on the sliding surface, in particular the rate of convergence to zero error.

The nonlinear function, sgn(s), is a sign function, which has a value of +1 for positive s, −1 for negative s, and 0 when s=0. As stated above, for the engine system of this description, s is vector-valued, and sgn(s) is applied to each component of the vector.

Sliding mode control with its discontinuous sgn(•) function is known to cause chattering. One of the standard ways of avoiding chattering is to replace sgn(•) with sat(•), a replacement that could be used here. Alternatively, sgn(•) can be replaced with s, yielding:

$$u=G^{-1}(x)[\dot{x}^*-f(x)-Me-A(M\sigma+e)]$$

$$u=G^{-1}(x)[-f(x)-(M+A)e-AM\sigma+\dot{x}^*]$$

$$\{\text{feedforward}\}\{P\}\{I\}\{D\} \tag{2}$$

As indicated above, Equation (2) can be rewritten as a multivariable PID controller with feedforward.

In replacing sgn(s) with s, the finite reaching time to the sliding surface is lost, where the "reaching time" is the time for forcing values to the sliding surface, s=0. However, the basic stability characteristics of the controller are maintained.

The engine model used to derive Equation (2), particularly f(x) and G(x), is an approximation. A further simplification can be achieved by rewriting Equation (2) in terms of the change in flow rates away from current flow rates, that is, in terms of Δu. Thus, $$\begin{aligned} u &= -G^{-1}(x)f(x) + G^{-1}(x)[-(M+A)e - AM\sigma + \dot{x}*] \\ &= u_{ff} + \Delta u \end{aligned}$$

where $u_{ff}$ is the solution of $0=\dot{x}=f(x)+G(x)u$ for a given steady state x. This information is available independently from the steady state characterization of the engine, and is more reliable. The focus is thus only on Δu.

$$\begin{aligned} \Delta u &= G^{-1}(x)[-(M+A)e - AM\sigma + \dot{x}*] \\ &\approx \tilde{G}^{-1}(x)[-(M+A)e - AM\sigma + \dot{x}*] \end{aligned} \tag{3}$$

where Ĝ is a constant matrix that represents the cross coupling between the flow rates and the manifold states over the feasible operating range. An approximation of Ĝ is obtained by singular value decomposition of the family $G(x)|_{steady\ state}$. Experimentation has been successful in identifying $\hat{G}$.

Values of Δu (changes in flowrates) are assigned to appropriate devices. For example, a change in the HPT valve 130 is effected by $\Delta w_{HPT}$. The $\Delta w_q$ value effects a change in fuel quantity, q, which is nominally based on the in-cylinder state.

Figure 2:
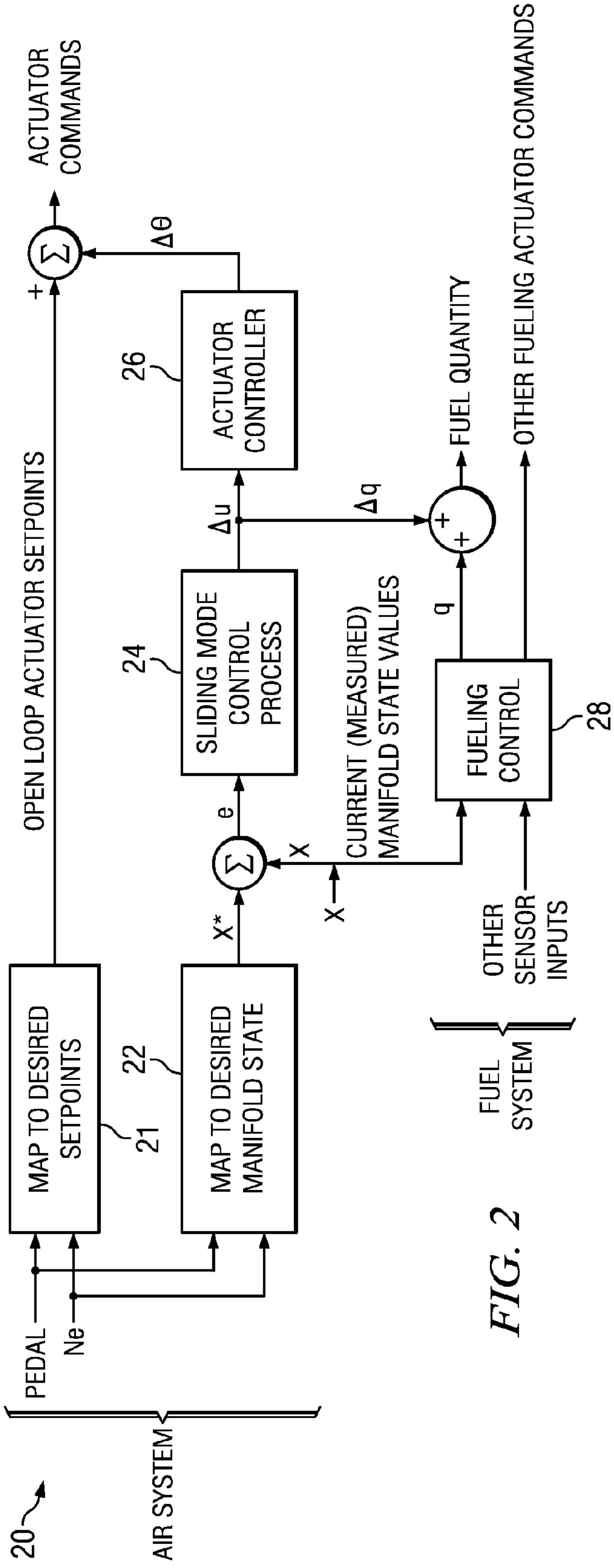
FIG. 2 illustrates the processing hardware and steps for implementing control for fuel quantity and air flow parameters, using a sliding mode control process.

FIG. 2 illustrates an engine control method in accordance with the invention. The steps of the method are indicated by the hardware that performs them, and in this sense, FIG. 2 further represents that portion of control unit 20 that implements the method described herein. As indicated, state values of x are used with a sliding mode control process 24 to determine flow change values, Δu, which in turn produce actuator change values, Δθ.

For the various air handling devices described above (high pressure throttle, EGR throttle, turbocharger, etc.), actuator setpoints are determined. For a given engine speed (Ne) and pedal position, there is a setpoint, θ, for each air handling actuator that will provide a desired engine performance. A mapping memory 21 maps engine speed and pedal position values to these setpoints.

Also based on engine speed (Ne) and pedal position, target manifold states are set to achieve a desired engine performance. The desired engine performance typically reflects desired torque, emissions and other conditions. These target values, x*, are stored in a mapping memory 22.

During engine operation, current engine speed (Ne) and pedal position values are delivered to mapping memories 21 and 22 to obtain desired actuator setpoint values and desired manifold state values, respectively.

Control unit 20 differences the desired state values and the measured manifold state values to obtain e, the "error" value. These error values are delivered to the sliding mode control process 24. In accordance with Equation (3), the sliding mode control process 24 determines values of Δu, the changes in flow rates from their current values. Sliding mode control process 24 is described below in detail in connection with FIG. 3.

For air handling control, an actuator controller 26 converts the flow change, Δu, values to Δθ values, which are added to the open loop actuator setpoints, θ, to generate actuator commands.

For fueling control, the state values, x, are delivered to a fueling control process 28, which receives other measured values and determines fueling parameter values. An example of a suitable process 28 is one based on in-cylinder condition estimation. For example, process 28 could receive, in addition to values of x, values from a MAF sensor, and temperature sensors for intake manifold and coolant. It uses these values to estimate the in-cylinder oxygen mass and concentration, as well as a representative temperature value. These estimations are then used to determine fueling control parameters, such as fueling quantity and injection timing. Examples of such a process are described in U.S. Pat. Pub. No. 2006/0122763; U.S. Pat. Pub. No. 2009/0007888, and U.S. patent application Ser. No. 12/134,598, each of which are incorporated herein by reference.

For purposes of the present invention, the fuel quantity value, q, from process 28 is added to the setpoint change value, Δq, from controller 26. This value is then used to generate a fueling quantity command to the appropriate fueling actuator.

Controller 26 may be a cross-coupled controller. However, controller 26 could be made diagonal if a dominant actuator (one actuator mostly affecting only one flow) is present in the system. In this manner, the change in flow rates, Δu, drives the most sensitive flow device to bring about the desired change in flow. No nominal flow rate information is needed.

Figure 3:
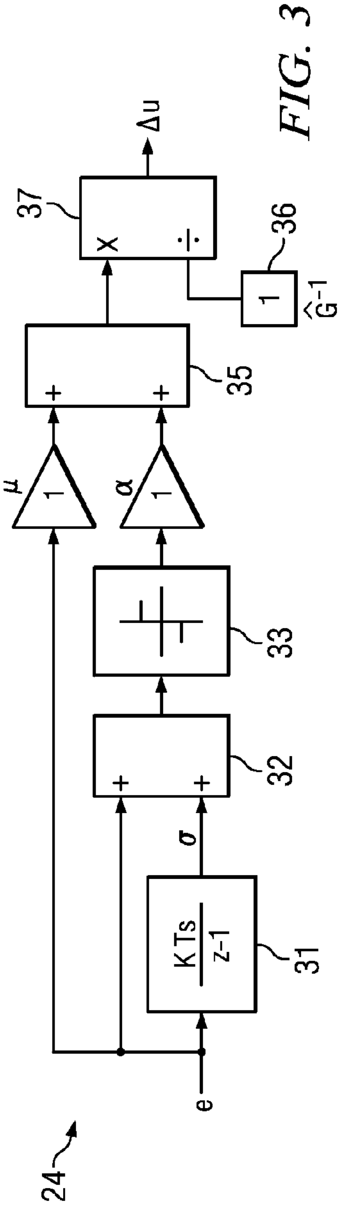
FIG. 3 illustrates the sliding mode control process of FIG. 2 in further detail.

FIG. 3 illustrates the sliding mode control process 24 in further detail. As explained above, the error value, e, represents the difference between measured (actual) and desired states. A discrete time integrator 31 uses the error value to generate values of σ. The e and σ values are added by process 32. A sign function process 33 is applied to the resulting sum. Gain functions, Mu and alpha, are applied to e and to the output of process 32. The resulting values are summed by process 35, and input to divide process 37. Values of $\hat{G}^{-1}$ are stored in matrix memory 36, and also input to divide process 37.

The outputs of process 37 are the flow rate change values, Δu. As explained above in connection with FIG. 2, these values are delivered to controller 26, which provides Δθ values for air handling actuators and a Δq value which is added to the q output of the fueling control process 28.

What is claimed is:

1. A sliding mode control unit for electronically controlling at least one air handling actuator of an internal combustion engine, the engine having an intake manifold and an exhaust manifold, and the engine having means for providing, during engine operation, current engine speed values, current accelerator position values, and current manifold state values, the manifold state values being intake and exhaust manifold pressure values and intake and exhaust manifold oxygen values, comprising:

- a memory for storing a map of engine speed values and accelerator pedal position values to desired air handling actuator setpoint values;
- a memory for storing a map of engine speed values and accelerator pedal position values to desired manifold state values;
- processing means for differencing the desired manifold state values and the current manifold state values, thereby obtaining error values;
- processing means for using a sliding mode control algorithm to compute flow change values, based on the error values;
- an actuator controller for computing actuator change values, based on the actuator flow change values; and
- processing means for calculating the difference between desired air handling actuator setpoint values and the actuator change values, thereby generating actuator command values.

2. The sliding mode control unit of claim 1, wherein the air handling actuator is an air intake throttle.

3. The sliding mode control unit of claim 1, wherein the air handling actuator is an EGR valve.

4. The sliding mode control unit of claim 1, wherein the air handling actuator is a turbocharger output control device.

5. The sliding mode control unit of claim 1, wherein the air handing actuator is one or more of the group of: air intake throttle, EGR valve, turbocharger output device.

6. The sliding mode control unit of claim 1, wherein the sliding mode control algorithm models the engine by equating flow rate change values to a gain matrix applied to a linear term representing the error values and a nonlinear term representing a switching function.

7. The sliding mode control unit of claim 6, wherein the gain matrix is a constant matrix that represent cross coupling between flow rates and manifold states.

8. The sliding mode control unit of claim 1, wherein the sliding mode control unit is further for controlling the engine's fuel injectors and the flow rate is fuel quantity, wherein the sliding mode control algorithm further calculates a fuel quantity change value, and further comprising a fueling control process whose output is differenced with the fuel quantity change value.

9. A sliding mode control method for electronically controlling at least one air handling actuator of an internal combustion engine, the engine having an intake manifold and an exhaust manifold, and the engine having means for providing, during engine operation, current engine speed values, current accelerator position values, and current manifold state values, the manifold state values being intake and exhaust manifold pressure values and intake and exhaust manifold oxygen values, comprising:

storing a map of engine speed values and accelerator pedal position values to desired air handling actuator setpoint values;

storing a map of engine speed values and accelerator pedal position values to desired manifold state values;

differencing the desired manifold state values and the current manifold state values, thereby obtaining error values;

using a sliding mode control algorithm to compute flow change values, based on the error values;

computing actuator change values, based on the actuator flow change values; and calculating the difference between desired air handling actuator setpoint values and the actuator change values, thereby generating actuator command values.

10. The sliding mode control method of claim 9, wherein the air handling actuator is an air intake throttle.

11. The sliding mode control method of claim 9, wherein the air handling actuator is an EGR valve.

12. The sliding mode control method of claim 9, wherein the air handling actuator is a turbocharger output control device.

13. The sliding mode control method of claim 9, wherein the air handing actuator is one or more of the group of: air intake throttle, EGR valve, turbocharger output device.

14. The sliding mode control method of claim 9, wherein the sliding mode control algorithm models the engine by equating flow rate change values to a gain matrix applied to a linear term representing the error values and a nonlinear term representing a switching function.

15. The sliding mode control method of claim 14, wherein the gain matrix is a constant matrix that represent cross coupling between flow rates and manifold states.

16. The sliding mode control unit of claim 1, wherein the sliding mode control unit is further for controlling the engine's fuel injectors and the flow rate is fuel quantity, wherein the sliding mode control algorithm further calculates a fuel quantity change value, and further comprising a fueling control process whose output is differenced with the fuel quantity change value.

* * * * *